United States Patent
Wölker (10) Patent No.: US 10,626,652 B2
(45) Date of Patent: Apr. 21, 2020

(54) DRIVE DEVICE FOR DISPLACING A VEHICLE PART, COMPRISING A MAGNETIC BRAKING UNIT

(71) Applicant: BROSE FAHRZEUGTEILE GMBH & CO. KG, BAMBERG, Bamberg (DE)

(72) Inventor: Florian Wölker, Hausen (DE)

(73) Assignee: BROSE FAHRZEUGTEILE GMBH & CO. KOMMANDITGESELLSCHAFT, BAMBERG, Bamberg (DE)

( * ) Notice: Subject to any disclaimer, the term of this patent is extended or adjusted under 35 U.S.C. 154(b) by 108 days.

(21) Appl. No.: 15/758,937

(22) PCT Filed: Oct. 27, 2016

(86) PCT No.: PCT/EP2016/075958
§ 371 (c)(1),
(2) Date: Mar. 9, 2018

(87) PCT Pub. No.: WO2017/072245
PCT Pub. Date: May 4, 2017

(65) Prior Publication Data
US 2019/0032387 A1    Jan. 31, 2019

(30) Foreign Application Priority Data
Oct. 28, 2015   (DE) .................. 10 2015 221 067

(51) Int. Cl.
*B60J 5/10* (2006.01)
*B62D 33/027* (2006.01)
(Continued)

(52) U.S. Cl.
CPC .............. *E05F 3/00* (2013.01); *E05F 15/614* (2015.01); *E05F 15/622* (2015.01); *B60J 5/10* (2013.01);
(Continued)

(58) Field of Classification Search
CPC ......... B60J 5/10; B60J 5/101; B62D 33/0273; E05F 3/00; E05F 15/614; E05F 15/622;
(Continued)

(56) References Cited

U.S. PATENT DOCUMENTS

2004/0020737 A1   2/2004 Webber
2006/0289821 A1   12/2006 Ritter
(Continued)

FOREIGN PATENT DOCUMENTS

CN    201598925 U   10/2010
CN    102031909 A    4/2011
(Continued)

OTHER PUBLICATIONS

Chinese First Office action dated May 8, 2019 issued in corresponding CN Application No. 201680063374.5, 9 pages, English translation, 5 pages.

*Primary Examiner* — Gregory A Blankenship
(74) *Attorney, Agent, or Firm* — Lewis Roca Rothgerber Christie LLP (57) ABSTRACT

It is provided a driving device for adjusting a vehicle part, in particular a tailgate, comprises an electric drive for driving the vehicle part, with an output shaft for transmitting an adjusting force to the vehicle part, and a first braking device operatively connected to the output shaft, which includes at least one permanent magnet element and is configured to provide a braking force for arresting the vehicle part in a currently adopted position. There is also provided a second braking device that is configured to switch the electric drive into a generator braking mode in order to at least partly feed a power generatorically produced by the drive back into the drive and thereby provide a braking force for braking a movement of the vehicle part.

20 Claims, 6 Drawing Sheets

(51) Int. Cl.
*E05F 3/00* (2006.01)
*E05F 15/614* (2015.01)
*E05F 15/622* (2015.01)
*H02P 31/00* (2006.01)

(52) U.S. Cl.
CPC ....... *B62D 33/027* (2013.01); *E05Y 2201/258* (2013.01); *E05Y 2201/438* (2013.01); *E05Y 2201/442* (2013.01); *E05Y 2201/686* (2013.01); *E05Y 2201/70* (2013.01); *E05Y 2201/702* (2013.01); *E05Y 2201/716* (2013.01); *E05Y 2900/546* (2013.01); *H02P 31/00* (2013.01)

(58) Field of Classification Search
CPC ......... E05Y 2201/258; E05Y 2201/438; E05Y 2201/442; E05Y 2201/686; E05Y 2201/70; E05Y 2201/702; E05Y 2201/716; E05Y 2900/546
USPC ..................... 296/146.4, 146.8, 56
See application file for complete search history.

(56) References Cited

U.S. PATENT DOCUMENTS

| | | | |
|---|---|---|---|
| 2009/0200830 A1* | 8/2009 | Paton | B60J 5/101 296/146.8 |
| 2011/0068721 A1 | 3/2011 | Bochen | |
| 2012/0013143 A1* | 1/2012 | Schiegel | E05F 15/40 296/146.4 |
| 2014/0224045 A1* | 8/2014 | Kummer | E05F 15/622 74/60 |
| 2015/0040698 A1 | 2/2015 | Kessler et al. | |
| 2015/0207437 A1 | 7/2015 | Nagler | |
| 2015/0222168 A1* | 8/2015 | Sakai | H02K 49/106 310/93 |
| 2015/0222169 A1 | 8/2015 | Sakai et al. | |
| 2016/0177612 A1* | 6/2016 | Buchheim | E05F 5/025 296/50 |
| 2016/0278176 A1* | 9/2016 | Chen | H05B 39/044 |
| 2017/0248183 A1* | 8/2017 | Strobel | F16D 63/002 |
| 2017/0302067 A1* | 10/2017 | Bochen | E05F 15/622 |
| 2019/0017311 A1* | 1/2019 | McGettrick | E05F 15/603 |
| 2019/0032387 A1* | 1/2019 | Wolker | E05F 15/622 |
| 2019/0211604 A1* | 7/2019 | Scheuring | B60J 5/10 |

FOREIGN PATENT DOCUMENTS

| | | |
|---|---|---|
| CN | 103930638 A | 7/2014 |
| DE | 102005030053 A1 | 12/2006 |
| DE | 102008042183 A1 | 3/2010 |
| DE | 102011112273 A1 | 3/2013 |
| DE | 102014220414 A1 | 4/2016 |
| EP | 1534971 B1 | 1/2008 |
| EP | 1940012 A1 | 7/2008 |
| EP | 2902578 A2 | 8/2015 |
| EP | 2902579 A2 | 8/2015 |
| FR | 2818304 A1 | 6/2002 |
| JP | 201241962 A | 3/2012 |
| WO | WO 2010/031729 A1 | 3/2010 |

* cited by examiner

DRIVE DEVICE FOR DISPLACING A VEHICLE PART, COMPRISING A MAGNETIC BRAKING UNIT

CROSS-REFERENCE TO A RELATED APPLICATION

This application is a National Phase Patent Application of International Patent Application Number PCT/EP2016/075958, filed on Oct. 27, 2016, which claims priority to and the benefit of German Patent Application Number 10 2015 221 067.7, filed on Oct. 28, 2015, the contents of both of which are incorporated herein by reference.

BACKGROUND

This invention relates to a driving device for adjusting a vehicle part and to a method for operating a driving device.

Such a driving device comprises an electric drive for driving the vehicle part. The electric drive includes an output shaft for transmitting an adjusting force to the vehicle part. To this output shaft a first braking device is connected, which includes at least one permanent magnet element and is configured to provide a braking force for arresting the vehicle part in a currently adopted position.

In a driving device known from EP 1 940 012 A1 a braking device in the form of a so-called hysteresis brake includes a disk-shaped carrier element non-rotatably connected to an output shaft, to which a ring-shaped hysteresis element made for example of a soft-magnetic material is attached. The hysteresis element faces two permanent magnets on a stator. The hysteresis brake provides a braking force both at standstill and in movement of a tailgate, wherein the hysteresis brake can be switchable in order to reduce the braking force for example during a manual movement of the tailgate.

From FR 2 818 304 a drive for adjusting a vehicle part is known. The drive includes a braking device for holding the vehicle part in a set position.

In a driving device for pivoting a flap arranged on a body of a vehicle as it is known from DE 10 2005 030 053 A1 a braking device is provided, in which a brake disk is arranged on a shaft, which is brakingly acted upon by a brake element.

From EP 1 534 971 B1 a spring clutch actuated by a magnetic brake is known, in which a magnet is arranged in a position opposite a rotor disk. In the braking device described there a braking force is produced by inducing eddy currents.

From the prior art, there are also known so-called wrap spring brakes that use a wrap spring arranged in a brake pot. On introduction of a drive-side force the wrap spring is loaded to release an abutment with the brake pot, so that an output shaft can be driven without a large braking effect of the wrap spring. On the other hand, when a drive-side force is applied to the output shaft, the wrap spring is loaded in the direction of its abutment with the brake pot, so that the output shaft is braked and the output-side force is dissipated without the output shaft being adjusted.

Conventional braking devices of this type are expensive and have a considerable need for installation space. In addition, braking devices that utilize a friction for braking are susceptible to wear and possibly temperature-sensitive.

SUMMARY

It is an object of the present invention to provide a driving device comprising a permanent magnet brake, which can of simple and space-saving construction and provide a reliable braking force. There should also be provided a method by which such a driving device can be operated advantageously.

This object is solved by a subject-matter with features as described herein.

Accordingly, the driving device includes a second braking device that is configured to switch the electric drive into a generator braking mode in order to at least partly feed a power generatorically produced by the drive back into the drive and thereby provide a braking force for braking a movement of the vehicle part.

The connecting device thus includes two braking devices. A first braking device that includes a permanent magnet element and thus is designed as a permanent magnet brake in particular serves to provide a braking force at standstill of the vehicle, so that this first braking device in particular serves as a parking brake. A second braking device on the other hand is designed as a generator brake and in particular serves to provide a braking force in movement of the vehicle part. The second braking device utilizes a braking force provided by the drive, when the drive is switched into a generator braking mode.

The first braking device designed as a permanent magnet brake can be integrated into the drive in a space-saving way and thus requires a small installation space. The second braking device on the other hand can be realized by an electric wiring of the drive, so that the second braking device also requires only few additional components and a small additional installation space.

The first braking device for example can include a stationary portion and a first permanent magnet element non-rotatable relative to the stationary portion. In one embodiment, a second permanent magnet element rotatable about a longitudinal axis relative to the stationary portion additionally is provided, which is operatively connected to the output shaft such that the second permanent magnet element is rotated relative to the stationary portion during a rotary movement of the output shaft. The stationary portion for example can be realized by a housing of the second braking device. The first permanent magnet element, which is fixed relative to the stationary portion, for example the housing, and the second permanent magnet element, which is rotated during a rotary movement of the output shaft relative to the first permanent magnet element, interact magnetically and in this way provide a braking force.

The braking force here can be such that in particular at standstill of the vehicle part and thus at standstill of the output shaft the second permanent magnet element is held in position relative to the first permanent magnet element, so that the first braking device provides an arresting force for adjusting the output shaft and hence the vehicle part driven by the output shaft.

The first permanent magnet element and the second permanent magnet element preferably each are of multipole design with magnetic poles that are offset with respect to each other along a circumferential direction about the longitudinal axis. Each permanent magnet element includes at least one pair of magnetic poles with two unlike magnetic poles offset with respect to each other along the circumferential direction, wherein in a braking condition the magnetic poles of the first permanent magnet element face the magnetic poles of the second permanent magnet element in a magnetically attracting manner, so that due to the forces of magnetic attraction the permanent magnet elements are held in position relative to each other and an arresting braking force is exerted on the output shaft.

In principle, one pair of magnetic poles on each permanent magnet element is sufficient. The provided (maximum) braking force, however, can be set by selecting the number of the pairs of magnetic poles, wherein it applies that the (maximum) braking force is the greater the more pairs of magnetic poles are present. For example, the permanent magnet elements can include three, four or five pairs of magnetic poles.

The permanent magnet elements are congruent in terms of their magnetic poles. In particular, the permanent magnet elements have the same number of magnetic poles, so that in the braking condition just one north pole of the second permanent magnet element faces one south pole of the first permanent magnet element (and vice versa), and thus a holding force is effected between the permanent magnet elements due to the magnetic attraction.

The first braking device preferably acts solely due to the magnetic forces acting between the permanent magnet elements. The braking force provided by the first braking device thus is caused by the magnetic attraction between the permanent magnet elements, but not by friction of the permanent magnet elements against each other. Correspondingly, the first permanent magnet element and the second permanent magnet element can be spaced apart from each other, so that during a rotary movement of the second permanent magnet element relative to the first permanent magnet element no (significant) frictional forces are caused.

In principle, different arrangements of the permanent magnet elements relative to each other are conceivable and possible.

For example, the permanent magnet elements each can be designed disk-shaped in the manner of circular disks and face each other axially with their front sides. In this case, the permanent magnet elements preferably are spaced apart from each other axially.

In an alternative aspect, the permanent magnet elements can be designed cylindrical and be arranged concentrically relative to each other. In this case, the first permanent magnet element for example is arranged radially outside the second permanent magnet element, wherein the permanent magnet elements preferably are spaced apart from each other radially.

When the permanent magnet elements each are of multipole design with a plurality of magnetic poles offset with respect to each other along the circumferential direction, the braking torque provided in total during a rotary movement of the output shaft preferably is 0. The first braking device thus provides a (significant) braking force merely at standstill of the output shaft, which braking force has an arresting effect on the output shaft. On the other hand, in the case of a rotary movement of the output shaft the braking forces caused in total at the braking device by a revolution of the second permanent magnet element just cancel each other out, so that in particular during a faster rotary movement the braking device no longer provides any braking force and thus does not counteract the movement of the vehicle part.

The first braking device in this way effects an arrestment of the output shaft up to a predetermined limit torque that is determined by the forces of magnetic attraction between the permanent magnet elements. When this limit torque is exceeded, the second permanent magnet element is rotated relative to the first permanent magnet element, so that the arresting effect of the permanent magnet brake is eliminated. Only when the torque acting on the output shaft again falls below the limit torque do the permanent magnet elements in turn get into a braking position relative to each other, in which the permanent magnet elements are magnetically held in position relative to each other, so that the output shaft is arrested.

Between the permanent magnet elements for example an intermediate element made of a non-magnetizable material can be arranged. This intermediate element separates the permanent magnet elements from each other and for example can serve to set a defined distance between the permanent magnet elements. It here is conceivable and possible that the permanent magnet elements frictionally rest against the intermediate element. However, when the braking device should not have a frictional effect and provide an adjusting force merely due to the magnetic attraction between the permanent magnet elements, at least one of the permanent magnet elements preferably is spaced apart from the intermediate element.

To conduct a magnetic flux on a side facing away from the respective other permanent magnet element and thus avoid an excessive field expansion outside the braking device in particular in the case of a multipole design of the permanent magnet element, a return element preferably is provided on one or on both of the permanent magnet elements. The return element here is arranged on the back of the associated permanent magnet element, i.e. on a side of the permanent magnet element facing away from the other permanent magnet element, and for example is made of a soft-magnetic material, for example of steel.

In one embodiment, the first braking device can be switchable for setting the provided braking force. For example, the axial or radial distance between the permanent magnet elements can be varied in order to in this way vary the braking force provided due to the magnetic forces acting between the permanent magnet elements. The braking device for example can be switched between a first condition in which the permanent magnet elements are approached to each other and a second condition in which the permanent magnet elements are apart from each other, in order to set an increased braking effect in the first condition and a reduced braking effect in the second condition.

While the first braking device is to be provided as an additional unit, for example at the drive of the driving device, the second braking device in a simple way can be realized by an electric circuit with a resistor. Via the resistor (with a comparatively small resistance value, for example below 100 Ohm) connections of the electric drive can be short-circuited, so that in this way the drive can be switched into a generator braking mode. When a torque is exerted on the output shaft on the output side and a rotary movement of the output shaft occurs as a result, the drive generatorically counteracts this rotary movement, so that the rotary movement of the output shaft is braked.

The second braking device preferably includes an electronic control unit for control purposes. By means of the electronic control unit the electric circuit is controlled in order to selectively short-circuit or not short-circuit the connections of the drive via the resistor. By means of the electronic control unit it can thus be controlled whether or not a movement of the vehicle part is braked. When it is recognized for example that a user manually grasps the vehicle part in order to move the vehicle part, the electronic control unit can open the connections of the drive, so that no generatoric counterforces are produced and a smooth movement of the vehicle part is possible.

The control of the circuit can be effected in dependence on the torque or the speed of the drive. However, what is also conceivable and possible is a control for example depending on the situation or in dependence on the ambient conditions.

For example, upon detection of a manual movement the short-circuit connection can be opened in order to provide for a smooth movement of the vehicle part.

In one embodiment, the resistance can be variable. For example, the resistance can be temperature-dependent and thus change with the temperature, so that temperature-related changes in the system, for example in the sluggishness of the component to be adjusted, can be counteracted.

In one embodiment, the resistance also can be variable by the electronic control unit and thus be controllable. The electronic control unit in particular can be configured to control the resistance in dependence on the torque, on the speed or the motor current or in dependence on at least one ambient condition, for example in dependence on an ambient temperature. For example, at low temperatures the adjusting forces required for adjusting the vehicle part can be higher. By increasing the resistance, for example by using temperature-dependent components, the braking forces provided by the second braking device can be reduced so as to counteract the increase of the adjusting force. In the opposite case, the resistance value can be lowered in the case of a temperature increase.

In a concrete aspect, the electronic control unit can be configured to detect a terminal voltage between the connections of the electric drive in order to control or regulate the electric circuit for short-circuiting the connections in dependence on the terminal voltage. With reference to the terminal voltage it can be monitored whether or not the drive is to be short-circuited. When the terminal voltage for example is less than a predetermined threshold value, the drive is short-circuited via the resistor. When the terminal voltage on the other hand is greater than the predetermined threshold value, the short-circuit connection is opened, so that no generatoric braking forces are provided at the drive.

When the vehicle part is adjusted manually, the second braking device generatorically counteracts the adjusting movement and brakes the adjusting movement when the drive is switched into the generator mode. With increasing adjustment speed the terminal voltage between the connections rises. When the threshold value thereby is exceeded, the short-circuit connection between the connections of the drive is opened, so that the braking force is switched off and thus a further adjustment of the vehicle part can smoothly be effected. When the threshold voltage in turn is not reached, the short-circuit connection in turn can be closed, so that the second braking device has a braking effect.

Thus, by monitoring the terminal voltage a speed-dependent control or regulation of the braking device can be effected. The electronic control unit can be configured to vary the threshold value for example in dependence on at least one ambient condition, for example the ambient temperature. For example, at low ambient temperatures a small threshold value can be set, while at high ambient temperatures a comparatively larger threshold value is set. In this way, the second braking device can be controlled in dependence on the environment in order to provide a braking force.

The threshold value here can lie (distinctly) below the terminal voltage that occurs in operation of the electric motor, i.e. when energizing the electric motor to adjust the vehicle part. In this way, the short-circuit connection between the connections of the drive is opened in the electric mode of the drive, i.e. at the operating voltage of the drive, so that no current flows over the resistor.

The object also is solved by a method for operating a driving device for adjusting a vehicle part, in particular a tailgate. In the method, an electric drive drives the vehicle part in that an output shaft of the drive transmits an adjusting force to the vehicle part. A first braking device operatively connected to the output shaft, which includes at least one permanent magnet element, provides a braking force for arresting the vehicle part in a currently adopted position. It also is provided that during a movement of the vehicle part a second braking device provides a braking force for braking the movement of the vehicle part in that the electric drive is switched into a generator braking mode.

The advantages and advantageous aspects, which have been explained above for the driving device, also are analogously applied to the method, so that reference is made to what has been explained above.

BRIEF DESCRIPTION OF THE DRAWINGS

The idea underlying the invention will be explained in detail below with reference to the exemplary embodiments illustrated in the Figures.

DETAILED DESCRIPTION

Figure 1:
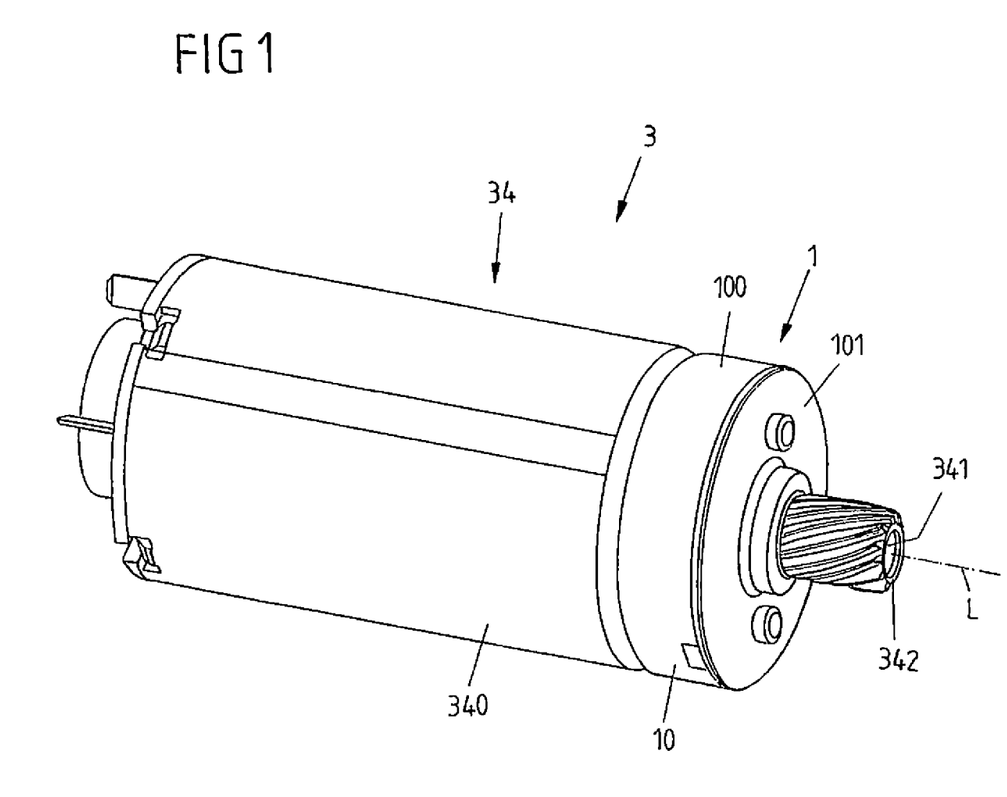
FIG. 1 shows an overall view of a driving device comprising a permanent magnet brake.

FIG. 1 shows a perspective view of a driving device 3 that includes an electric drive 34 and a permanent magnet brake 1. The electric drive 34 is designed as an electric motor and in a housing 340 includes a stator fixed with respect to the housing 340 and a rotor rotatable with respect to the stator. The rotor is rotatable about a longitudinal axis L and drives an output shaft 341 on which a pinion element 342 is arranged for driving a downstream transmission 35 (see FIGS. 3A and 3B) for adjusting a vehicle part.

Figure 2:
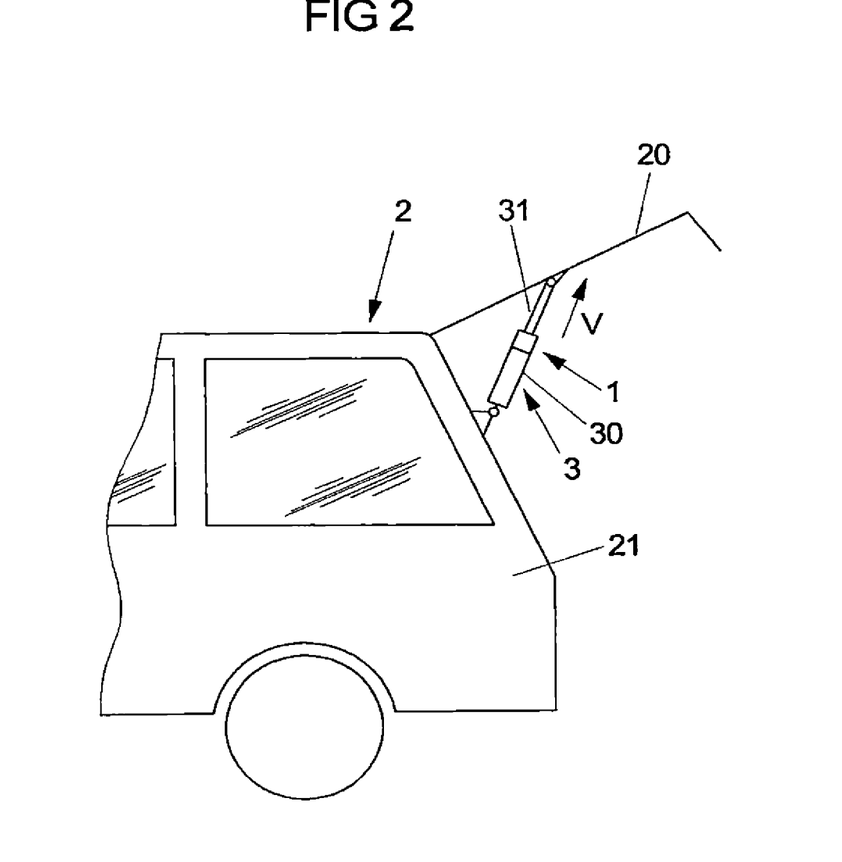
FIG. 2 shows a schematic view of a vehicle comprising a driving device for adjusting a tailgate.

As can be seen in FIG. 2, a driving device 3 of this kind for example can serve to adjust a tailgate 20 of a vehicle 2. The driving device 3 acts between the tailgate 20 and a body 21 of the vehicle 2 in a manner known per se.

In principle, a driving device 3 as described here can, however, also be used for adjusting completely different types of vehicle parts.

Figure 3A:
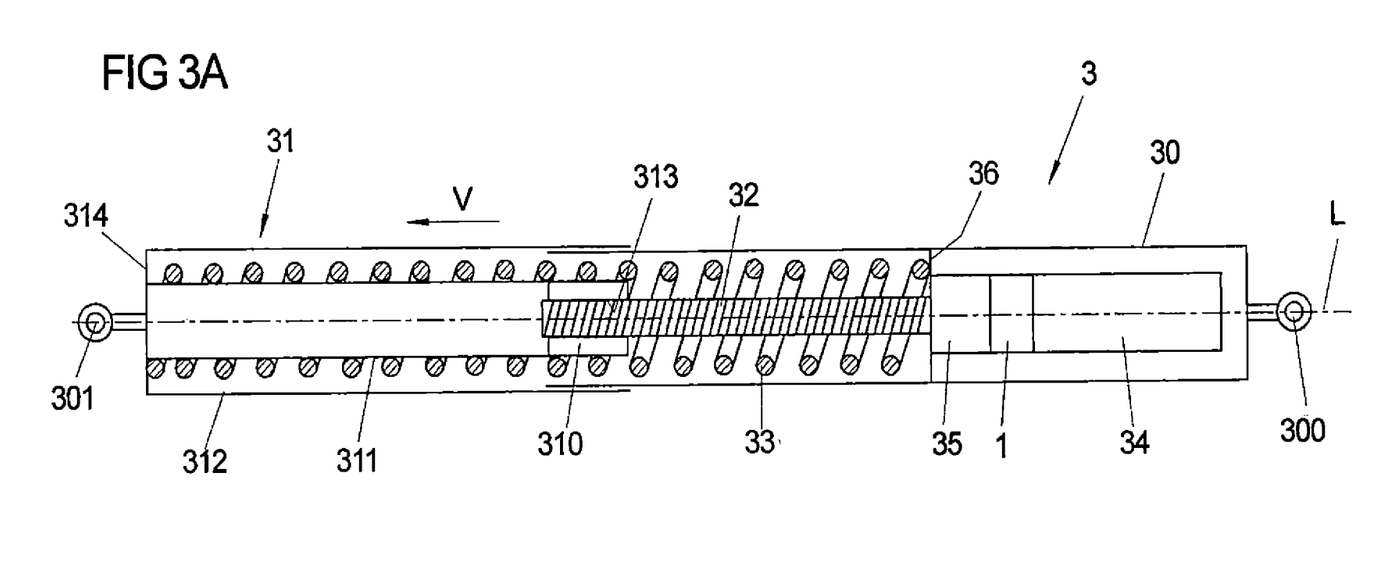
FIG. 3A shows a schematic view of an exemplary embodiment of a driving device in the form of a spindle drive, in the extended position of a push rod.
Figure 3B:
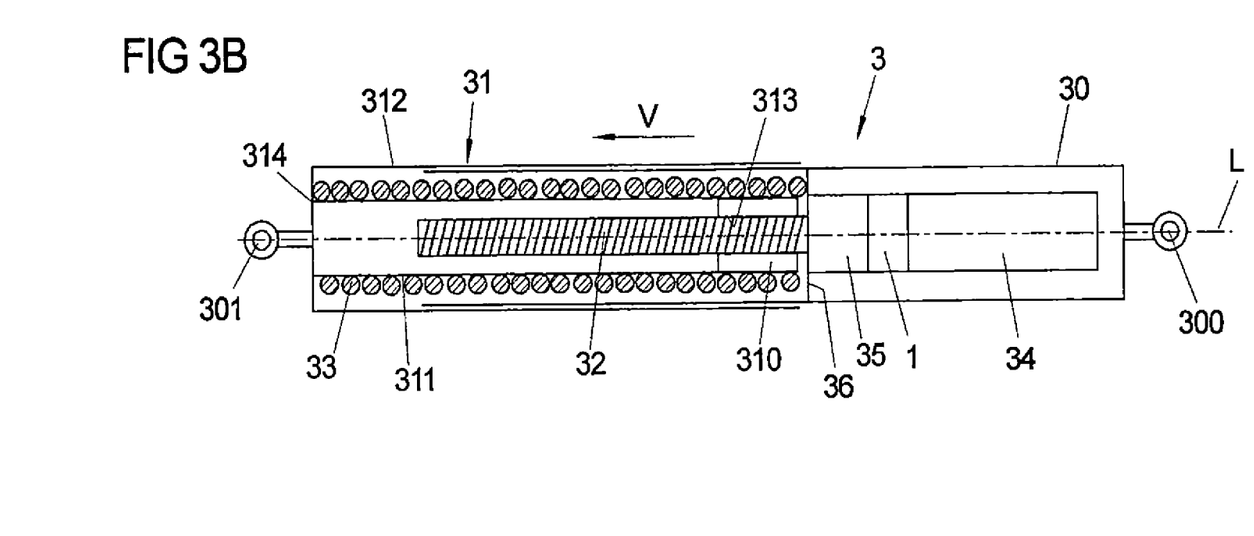
FIG. 3B shows a schematic view of the driving device with retracted push rod.

The driving device 3 for example can be configured as a spindle drive as it is shown in an exemplary embodiment in FIGS. 3A and 3B.

In the concrete exemplary embodiment of a driving device 3 in the form of a spindle drive as it is shown in FIGS. 3A and 3B the driving device 3 includes a spindle 22 that extends along a longitudinal axis L, is rotatably arranged on a housing 30 and is connected to an electric drive 34 in the form of an electric motor.

On its outer shell surface, the spindle 32 has an external thread that is in engagement with an internal thread of a bore 313 of a spindle nut 310. The spindle nut 310 is non-rotatably held at an (inner) tube of a push rod 31, which via a front side 314 facing away from the spindle nut 310 is mounted in a cladding tube 312. The cladding tube 312 is shiftably (but non-rotatably) mounted on the housing 30 along the longitudinal axis L, so that via the cladding tube 312 the tube 311 also is guided on the housing 30.

On the front side 314 of the push rod 31 a coupling point 301 is arranged for (pivotally) coupling the push rod 31 e.g. to the tailgate 20 (see e.g. FIG. 2). On the other hand, the housing 30 has a coupling point 300 at an end facing away from the push rod 31, via which the housing 30 is (pivotally) coupled e.g. to the body 21.

The electric drive 34 in the form of the electric motor is connected to the spindle 32 via a transmission 35. The electric drive 34 drives the transmission 35 via the output pinion 342 in order to transmit a torque for example in a stepped-down way to the spindle 32 via the transmission 35. The transmission 35 for example can be configured as a planetary transmission, wherein in principle entirely different types of transmission also are conceivable and possible.

In operation of the driving device 3, the electric motor 34 puts the spindle 32 into a rotary movement about the longitudinal axis L. Due to the threaded engagement of the spindle nut 310 with the spindle 32 and the firm connection of the spindle nut 310 to the push rod 31, the spindle nut 310 rolls off on the spindle 32, so that the spindle nut 310 is adjusted along the longitudinal axis L relative to the spindle 32, and the tube 311 and the cladding tube 312 are shifted together with the spindle nut 310 and thus the entire push rod 31 is moved.

FIG. 3A shows the driving device 3 in an extended position at which the spindle nut 310 has been shifted to an end of the spindle 32 facing away from the transmission 35. FIG. 3B on the other hand shows the driving device 3 in a retracted position at which the spindle nut 310 has been approached to the end of the spindle 32 facing the electric motor 34.

The push rod 31 is pretensioned with respect to the housing 30 via a spring 33 in the form of a compression spring and to this end supported on a support 36 on the housing 30. In the illustrated example, pretensioning is effected in the direction of the extended position (see FIG. 3A), so that on a retraction of the push rod 31 the spring 33 is tensioned under pressure against the adjustment direction V, as this is shown in FIG. 3B. By means of the spring 33 a manual adjustment of the tailgate 20 can be supported for example in the direction of an open position. Possibly, however, such a spring 33 can also be omitted.

As shown in FIG. 1, the driving device 3 also includes a permanent magnet brake 1 with a housing 10 that is composed of housing parts 100, 101. The permanent magnet brake 1 acts on the output shaft 341 of the drive 34 and serves to provide a braking force that in particular should serve for arresting the vehicle part driven by the driving device 3, in the present example for arresting the tailgate 20.

Figure 4A:
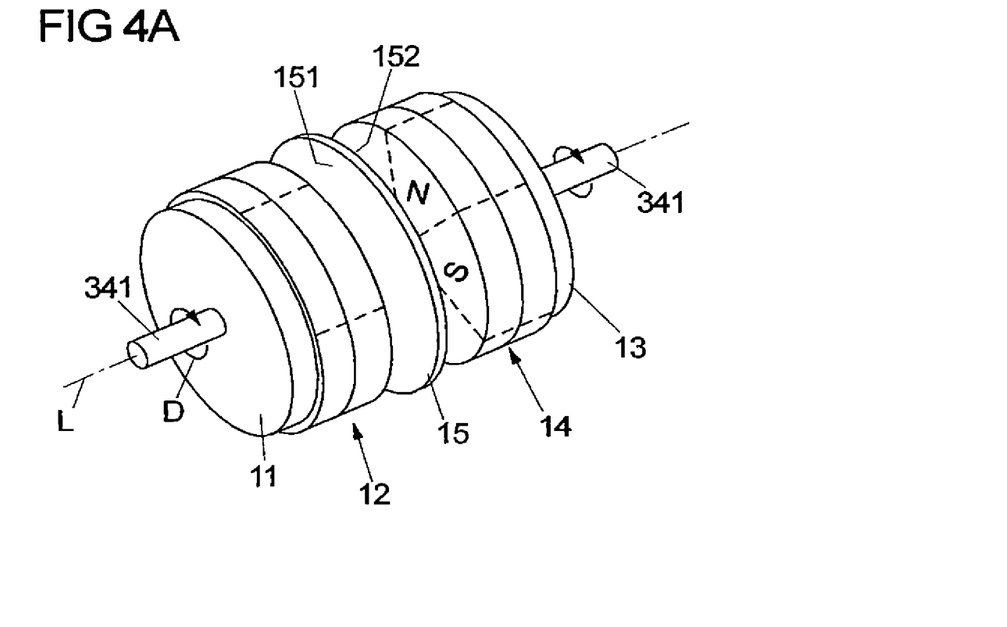
FIG. 4A shows a view of an exemplary embodiment of a permanent magnet brake.

FIG. 4A shows a perspective view of an exemplary embodiment of an assembly of a permanent magnet brake 1 that is enclosed in the housing 10. The assembly comprises a first return element 11, a first permanent magnet element 12, a second return element 13, a second permanent magnet element 14 and an intermediate element 15, which brakingly cooperate in operation of the permanent magnet brake 1.

The first return element 11 and the first permanent magnet element 12 jointly form a first brake element and are firmly, in particular non-rotatably connected to each other. For example, the first permanent magnet element 12 can be positively, non-positively and/or cohesively connected to the first return element 11, in that the first permanent magnet element 12 rotatorily is positively fixed to the first return element 11 for example via a suitable groove-spring connection or is cohesively connected to the first return element 11 by gluing.

The first return element 11 and the first permanent magnet element 12 are held non-rotatably in the housing 10 and rotatably with respect to the output shaft 341. The output shaft 341 thus can be rotated with respect to the first brake element formed by the first return element 11 and the first permanent magnet element 12, wherein the first brake element remains stationary relative to the housing 10 and thus is not rotated with the output shaft 341.

The second return element 13 and the second permanent magnet element 14 form a second brake element. The second return element 13 and the second permanent magnet element 14 are non-rotatably arranged on the output shaft 341 and thus are rotated together with the output shaft 341 when the output shaft 341 is rotated about the longitudinal axis L (rotary movement D).

For example, the permanent magnet element 14 can be non-rotatably connected to the output shaft 341, in that the permanent magnet element 14 is compressed with the output shaft 341 or positively connected to the output shaft 341. The return element 13 on the other hand can be non-rotatably, for example positively, non-positively and/or cohesively connected to the permanent magnet element 14.

The return elements 11, 13 serve as a magnetic return for conducting the magnetic flux effected by the permanent magnet elements 12, 14 and to this end are advantageously made of a soft-magnetic material, for example of steel. As will yet be explained below, the permanent magnet elements 12, 14 each are of multipole design with magnetic poles N, S circumferentially offset with respect to each other. Via the return elements 11, 13 made of a soft-magnetic material, a magnetic flux is conducted between adjacent poles S on the back of the permanent magnet elements 12, 14.

The permanent magnet elements 12, 14 on the other hand can be formed as sintered parts of a material with permanent-magnetic properties, e.g. of a neodymium material. In this connection it is, however, also conceivable and possible to form the permanent magnet elements 12, 14 as plastic parts, for example as an injection-molded plastic part, wherein in this case permanent-magnetic particles are embedded into the plastic material.

Between the permanent magnet elements 12, 14 an intermediate element 15 made of a non-magnetizable material, e.g. in the form of a thin plastic film, is arranged, which in particular should prevent that the brake elements form a connection with their permanent magnet elements 12, 14 by corrosion. The intermediate element 15—as seen in an axial direction along the longitudinal axis L—for example can have a thickness between 1 hundredth of a millimeter and 10 hundredths of a millimeter, for example 5 hundredths of a millimeter.

The permanent magnet elements 12, 14 serve to cause a braking effect between the brake elements 11, 12 or 13, 14 by magnetic attraction. The braking effect in particular should serve to arrest the vehicle part driven by the driving device 3, in the exemplary embodiment of FIG. 2 the tailgate 20, in a currently adopted position in order to prevent an unintentional movement of the tailgate 20. At standstill of the tailgate 20, the permanent magnet brake 1 thus should effect an arrestment of the tailgate 20. When a user grasps the tailgate 20 in order to move the tailgate 20, the permanent magnet brake 1 on the other hand should provide for a movement of the tailgate 20—upon exceedance of a limit torque.

Figure 5:
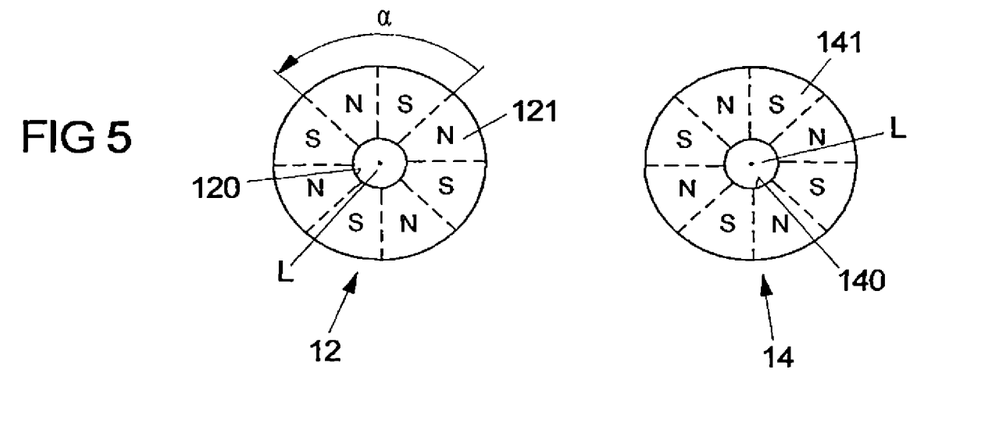
FIG. 5 shows schematic views of two permanent magnet elements of the permanent magnet brake, comprising magnetic poles arranged thereon.

To provide such an arresting effect, the permanent magnet elements 12, 14 each are of multipole design and, as shown schematically in FIG. 5, include periodically arranged magnetic poles N, S, which as seen in the circumferential direction about the longitudinal axis L are arranged offset with respect to each other such that a north pole N is followed by a south pole S and the south pole S in turn is followed by a north pole N. The arrangement of the magnetic poles N, S on the permanent magnet elements 12, 14 is congruent to each other. In particular, the permanent magnet elements 12, 14 have the same number of magnetic pole pairs (in the illustrated exemplary embodiment four magnetic pole pairs, wherein other numbers of magnetic pole pairs, for example five, six, seven or eight magnetic pole pairs, also are possible).

Figure 6A:
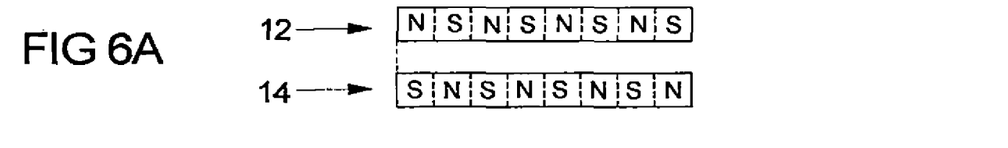
FIG. 6A shows an unrolled representation of the permanent magnet elements, in a braking condition with opposed, magnetically attracting magnetic poles.

In a braking condition, the magnetic poles N, S of the permanent magnet elements 12, 14, as schematically shown in FIG. 6A, face each other in a magnetically attracting manner. The permanent magnet element 14 thus is held in position relative to the permanent magnet element 12 fixed to the housing, so that the permanent magnet element 14 and thereby the output shaft 341 are arrested with respect to the housing 10 of the permanent magnet brake 1.

Figure 6B:
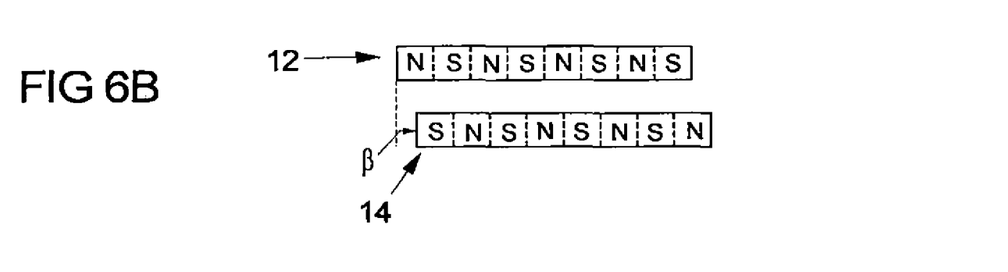
FIG. 6B shows a view of the permanent magnet elements with (minor) deflection.
Figure 6C:
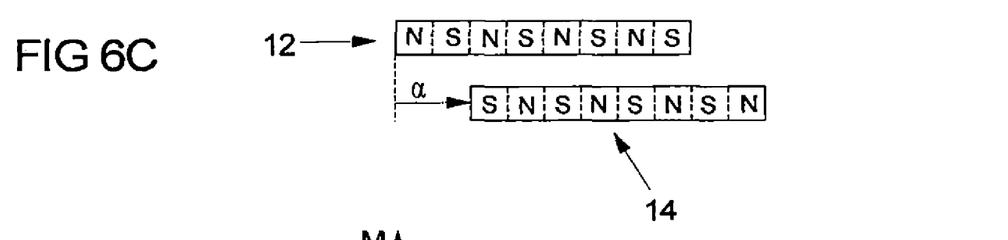
FIG. 6C shows a view of the permanent magnet elements during a relative movement of the permanent magnet elements by a period width of the periodically arranged magnetic poles.

In FIG. 6A (and likewise in the FIGS. 6B and 6C yet to be explained below) the permanent magnet elements 12, 14 are shown in an unrolled way, in that the actually circular permanent magnet elements 12, 14 are projected onto a line (corresponding to cutting up on a point of the circumference and unwinding onto a line). In the braking condition according to FIG. 6A a north pole of a permanent magnet element 12, 14 just faces a south pole S of the other permanent magnet element 14, 12. This corresponds to a non-loaded condition. When in operation a torque is exerted onto the output shaft 341—for example as a result of a load on the tailgate 20—, the permanent magnet elements 12, 14 can (slightly) be deflected relative to each other by an angle β, as this is illustrated in FIG. 6B. Because north poles N and south poles S of the permanent magnet elements 12, 14 thus are moved away from each other in pairs, a restoring magnetic force acts between the permanent magnet element 12, 14, which effects a restoring torque compensating the load acting on the tailgate 20 at the output shaft 341. In the braking condition at loads below the limit torque a rotation of the output shaft 341 thus is prevented and a load introduced on the output side thus is blocked.

When the load acting on the output shaft 341 however exceeds the predetermined limit torque, which is determined by the force of magnetic attraction between the permanent magnet elements 12 14, the permanent magnet element 14 slips through to the permanent magnet element 12 fixed to the housing, because the magnetic holding moment cannot stop the acting load. Slipping through is effected until the load moment in turn falls below the limit torque. When this is the case, the permanent magnet elements 12, 14 in turn adopt a position relative to each other in which a north pole N of the one permanent magnet element 12, 14 faces a south pole S of the other permanent magnet element 14, 12 in a magnetically attracting manner (and vice versa), and thus an arresting, magnetic coupling in turn is produced between the permanent magnet elements 12, 14.

Figure 6D:
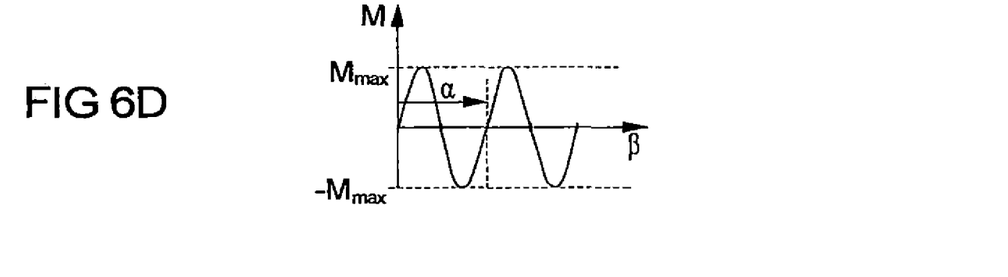
FIG. 6D shows a graphical representation of the holding moment acting due to a magnetic attraction between the permanent magnet elements over the angle.

The course of the moment M caused by the forces of magnetic attraction over the angle β between the permanent magnet elements 12, 14 is shown in FIG. 6D. The moment M has a sinusoidal course with a period width α corresponding to the period width α of the magnetic poles N, S at the permanent magnet elements 12, 14 (see FIG. 5). With a minor deflection, as shown in FIG. 6B, the holding moment initially rises until it reaches a maximum value Mmax. Thereafter, it decreases and crosses the zero line at an angle β that corresponds to a position of the permanent magnet elements 12, 14 relative to each other at which like poles of the permanent magnet elements 12, 14 face each other, i.e. a north pole N another north pole N and a south pole S another south pole S. After crossing the zero line, the holding moment becomes negative, so that the further movement of the permanent magnet elements 12, 14 relative to each other even is supported magnetically, until in turn a position is reached in which unlike poles N, S face each other in a magnetically attracting manner (see FIG. 6D).

The limit torque corresponds to the maximum holding moment Mmax. When the load moment acting on the output shaft 341 on the output side is greater than this limit torque Mmax, the permanent magnet element 14 is moved relative to the permanent magnet element 12, because the forces of magnetic attraction are not sufficient to magnetically non-rotatably hold the permanent magnet element 14 with respect to the permanent magnet element 12.

The braking effect between the permanent magnet elements 12, 14 can be achieved purely magnetically, so that a (minor) axial distance can be provided between the permanent magnet elements 12, 14. In addition, the permanent magnet elements 12, 14—with the interposition of the intermediate element 15—can however also be in frictional contact with each other, so that in addition frictional forces act, which are superimposed on the forces of magnetic attraction.

The permanent magnet brake 1 acts as a parking brake at standstill of the vehicle part driven by the driving device 3, in this case of the tailgate 20. When the tailgate 20 is moved and the output shaft 341 thus is rotated about its longitudinal axis L, the permanent magnet elements 12, 14 also are rotated relative to each other. Due to the sinusoidal course of the holding moment M acting between the permanent magnet elements 12, 14 (see FIG. 6D), the resultant moment acting during the rotation is equal to 0 per revolution, because the integral of the moment course is equal to 0. When the limit torque thus has been exceeded once by the load acting on the output shaft 341 and the output shaft 341 accordingly is put into a rotary movement D, the further rotation is effected smoothly without the permanent magnet brake 1 resisting such a rotation with significant forces.

In the exemplary embodiment according to FIG. 4A, the front sides of the permanent magnet elements 12, 14 axially face each other with the interposition of the intermediate element 15 and in a disk-shaped manner extend parallel to each other transversely to the longitudinal axis L. In another exemplary embodiment shown in FIG. 4B, permanent magnet elements 12, 14 on the other hand are arranged concentrically to each other. A cylindrical, first permanent magnet element 12 is arranged on a cylindrical return element 11 made of a soft-magnetic material and thereby non-rotatably connected to the housing 10 of the permanent magnet brake 1. The permanent magnet element 12 thus is held fixed to the housing via the return element 11. A second permanent magnet element 14 on the other hand is arranged on the output shaft 341 and non-rotatably connected to the output shaft 341, so that during a rotary movement D of the output shaft 341 about the longitudinal axis L the permanent magnet element 14 is rotated together with the output shaft 341. Between the permanent magnet elements 12, 14 a cylindrical intermediate element 15 made of a non-magnetizable material is arranged, wherein this intermediate element 15 can have a radial distance to each of the permanent magnet elements 12, 14 or can also be in abutment with the permanent magnet elements 12, 14.

Figure 4B:
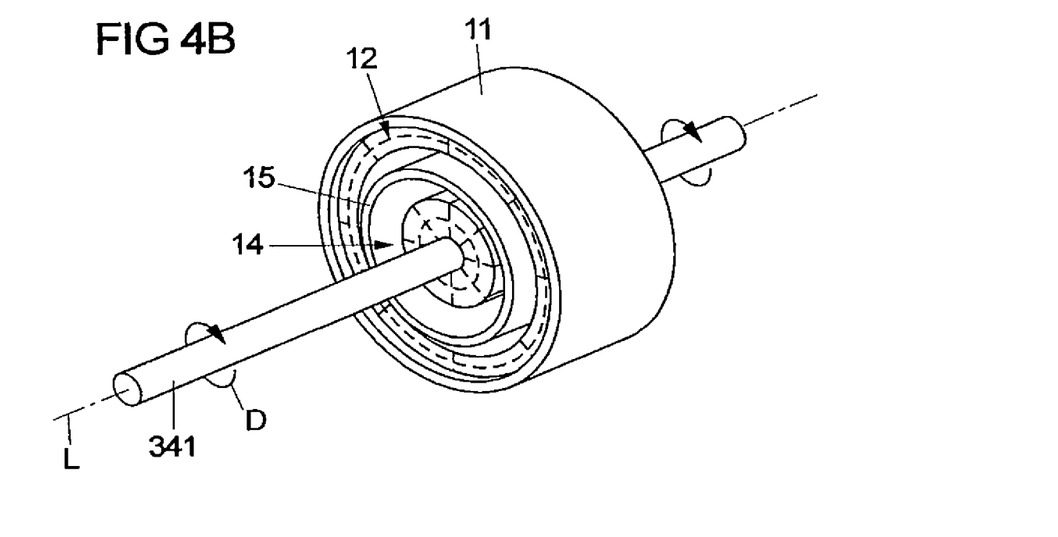
FIG. 4B shows a view of another exemplary embodiment of a permanent magnet brake.

In the exemplary embodiment according to FIG. 4B the permanent magnet elements 12, 14 also each are of multi-pole design with magnetic poles N, S offset with respect to each other along the circumferential direction about the longitudinal axis L. The number of the magnetic poles N, S of the permanent magnet elements 12, 14 here is identical, so that in a braking condition a magnetic pole N, S of the one permanent magnet element 12, 14 faces an unlike magnetic pole S, N of the other permanent magnet element 14, 12 and in this way a braking force is provided for arresting the output shaft 341 due to the magnetic holding forces.

The mode of operation of the permanent magnet brake 1 of this exemplary embodiment otherwise is identical to the one described above for the exemplary embodiment according to FIG. 4A, so that reference is made to what has been explained above.

The permanent magnet brake 1 of the driving device 3 has an arresting effect in order to hold the output shaft 341 in position at standstill of the tailgate 20. In movement of the tailgate 20 and during the resulting rotary movement of the output shaft 341 the resultant braking forces of the permanent magnet brake 1 by contrast are negligible, so that the permanent magnet brake 1 does not provide any significant resistance to the movement of the tailgate 20.

Figure 7:
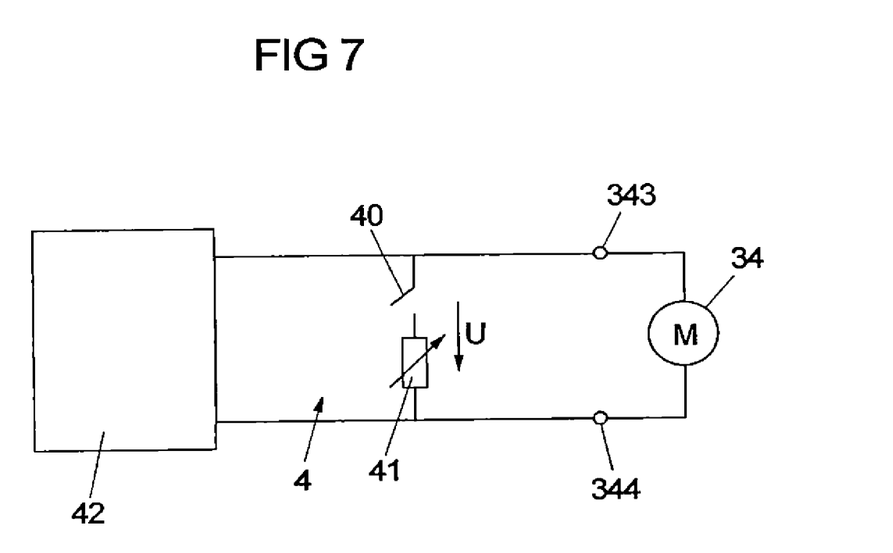
FIG. 7 shows a schematic view of a control device in cooperation with a drive of the driving device.

To also brake a movement of the tailgate 20, a second braking device 4 therefore is provided, which is schematically shown in FIG. 7. The second braking device 4 acts as a generator, in that the drive 34 is short-circuited via its connections 343, 344 by means of a resistor 41. When the output shaft 341 and thereby the rotor of the drive 34 is rotated with short-circuited connections 343, 344, this leads to an induction of a voltage between the connections 343, 344, as a result of which a current flows over the resistor 41 that is fed back into the drive 34 and hence leads to a braking effect.

The second braking device 4 thus is suited to counteract a movement of the tailgate 20. The braking effect of the second braking device 4 here is negligible at standstill (because at standstill of the output shaft 341 no voltage is induced at the drive 34). The braking devices 1, 4 thus complement each other to the effect that the first braking device 1 at standstill of the tailgate 20 and the second braking device 4 in movement of the tailgate 20 provide a braking force.

The second braking device 4 is controlled via a control device 42 that selectively switches the resistor 41 between the connections 343, 344 via a switching device 40 or opens the short-circuit connection created by means of the resistor 41 between the connections 343, 344. The control here can be effected in dependence on the torque, on the speed, on the motor current or also depending on the situation or in dependence on the ambient conditions, for example on the ambient temperature.

For control purposes, the control device 42 for example can monitor a voltage U obtained at the resistor 41, which corresponds to the terminal voltage between the connections 343, 344. This voltage U increases with increasing speed, because with increasing speed the voltage induced at the drive 34 and as a result the current flow through the resistor 41 increases.

The control here can be effected such that the connections 343, 344 are short-circuited via the resistor 41, as long as the voltage U lies below a threshold value. At a comparatively low adjustment speed of the tailgate 20 in the case of a manual adjustment of the tailgate 20, a braking effect thus is provided via the second braking device 4. However, when the voltage U rises above the threshold value, the short-circuit connection is opened via the switching device 40, so that the drive 34 no longer is in the generator braking mode and a further adjustment of the tailgate 20 thus can be effected smoothly. At higher adjustment speeds of the tailgate 20 the braking device 4 thus has no braking effect, so that the tailgate 20 can smoothly be moved manually by a user. When the voltage U in turn falls below the threshold value, the connections 343, 344 in turn are short-circuited, so that the braking device 4 brakes.

The switching device 40 for example can be configured as a mechanical relay or also as an electronic component, for example as a transistor.

The braking force provided by the second braking device also can be regulated, for example in that the braking force is set by a pulse width modulation (PWM) by pulse-like switching of the switching device 40.

The threshold value preferably is chosen such that it lies (distinctly) below the operating voltage occurring in the electric mode of the drive 34. When energizing the drive 34 for adjusting the tailgate 20, the short-circuit connection thus is opened, so that no current flows over the resistor 41.

The control device 42 here can be configured to adapt the threshold value for example in dependence on the ambient temperature. At low ambient temperatures the threshold value for example can be decreased in this way, while at high ambient temperatures a greater threshold value is set.

Alternatively or in addition, the control can also be effected depending on the situation. For example, when it is detected via a suitable sensor, for example a key sensor or a capacitive sensor or the like, that a user grasps the tailgate 20 for a manual adjustment, the short-circuit connection can be opened in order to provide for a smooth adjustment of the tailgate 20.

The resistor 41 can be variable, wherein a control of the resistance value for example can be effected via the control device 42. For example, the resistance value can be varied in dependence on the temperature in order to for example reduce the resistance value at a high ambient temperature or to increase the resistance value at a low ambient temperature. In this way, changes in the adjusting forces required for adjusting the tailgate 20 can be compensated.

The braking devices 1, 4 substantially can be wear-free. In particular, the first braking device 1, when the permanent magnet elements 12, 14 do not rub against each other, but exclusively interact magnetically, does not include any parts that are subject to a significant wear. Because the second braking device 4 also can be designed purely electrically, at least no mechanical wear occurs also at this second braking device 4.

The first braking device 1 can be integrated into the drive 34 and thus requires only a small additional installation space. Because the second braking device 4 can be realized by a small number of electrical components, the installation space requirement of the second braking device 4 also is minimal.

The idea underlying the invention is not limited to the exemplary embodiments described above, but in principle can also be realized in completely different embodiments.

In particular, a driving device as described here can also be used in another adjusting device in a vehicle. The driving device is also not limited to a spindle drive, but can be constructed quite differently.

A driving device as described here can also serve for adjusting entirely different vehicle parts, for example flaps or doors of vehicles. In so far, the driving device is not limited to the use on a tailgate.

LIST OF REFERENCE NUMERALS 1 braking device (permanent magnet brake)
10 housing
100, 101 housing part
11 return element
12 permanent magnet element
13 return element
14 permanent magnet element
15 intermediate element
151,152 side
2 vehicle
20 tailgate
21 body
3 driving device
30 housing
300 coupling point
301 coupling point
31 push rod
310 spindle nut
311 tube
312 cladding tube
313 bore
314 front side
32 spindle
33 compression spring
34 driving device (motor)
340 housing
341 output shaft
342 output pinion
343, 344 motor connections
35 transmission
36 support
4 braking device
40 switching device
41 resistor
42 electronic control unit
α, β angle
L longitudinal axis
M torque
$M_{max}$ maximum torque
U voltage
V adjustment direction

The invention claimed is:

1. A driving device for adjusting a vehicle part, the driving device comprising:
an electric drive for driving the vehicle part, the electric drive comprising an output shaft for transmitting an adjusting force to the vehicle part;
a first braking device operatively connected to the output shaft, the first braking device including at least one permanent magnet element and being configured to provide a braking force for arresting the vehicle part in a currently adopted position, wherein the at least one permanent magnet element comprises a first permanent magnet element rotatable about a longitudinal axis relative to a stationary portion of the first braking device, the first permanent magnet element being operatively connected to the output shaft such that the first permanent magnet element is rotated relative to the stationary portion during a rotary movement of the output shaft; and
a second braking device that is configured to switch the electric drive into a generator braking mode in order to at least partly feed a power generatorically produced by the electric drive back into the electric drive and thereby provide a braking force for braking a movement of the vehicle part.

2. The driving device according to claim 1, wherein the first braking device includes a second permanent magnet element non-rotatable relative to the stationary portion.

3. The driving device according to claim 2, wherein the first permanent magnet element and the second permanent magnet element each include at least one magnetic pole pair with two unlike magnetic poles offset with respect to each other along a circumferential direction about the longitudinal axis, wherein in a braking condition the magnetic poles of the first permanent magnet element face the magnetic poles of the second permanent magnet element in a magnetically attracting manner in order to provide the braking force.

4. The driving device according to claim 2, wherein the first permanent magnet element and the second permanent magnet element are spaced apart from each other axially or radially and do not frictionally rest against each other.

5. The driving device according to claim 2, wherein the braking force provided by the first braking device due to the magnetic attraction of the first and second permanent magnet elements during a rotary movement of the output shaft in total is zero over a revolution of the first permanent magnet element.

6. The driving device according to claim 2, wherein an intermediate element made of a non-magnetizable material is located between the first and second permanent magnet elements.

7. The driving device according to claim 2, wherein at least one of the first or second permanent magnet elements is connected to a return element made of a soft-magnetic material to provide a magnetic return.

8. The driving device according to claim 1, wherein the first braking device is switchable for setting the provided braking force.

9. The driving device according to claim 1, wherein the second braking device includes an electric circuit with a resistor, wherein the electric circuit is configured to short-circuit connections of the electric drive via the resistor.

10. The driving device according to claim 9, wherein the resistance is variable.

11. The driving device according to claim 9, wherein the second braking device includes an electronic control unit that is configured to control the electric circuit.

12. The driving device according to claim 11, wherein the electronic control unit is configured to vary the resistance.

13. The driving device according to claim 11, wherein the electronic control unit is configured to detect a terminal voltage between the connections of the electric drive and, depending on the terminal voltage, is configured to control the electric circuit for short-circuiting the connections.

14. The driving device according to claim 13, wherein the electronic control unit is configured to short-circuit the connections via the resistor when the terminal voltage is less than a predetermined threshold value, and is configured to open the short-circuit connection via the resistor when the terminal voltage is greater than the predetermined threshold value.

15. The driving device according to claim 14, wherein the electronic control unit is configured to set the threshold value depending on at least one ambient condition.

16. The driving device according to claim 1, wherein the vehicle part is a tailgate.

17. The driving device according to claim 12, wherein the electronic control unit is configured to vary the resistance in dependence on the torque of the drive, on the speed of the drive, on a motor current, or at least on an ambient condition.

18. The driving device according to claim 15, wherein the at least one ambient condition is ambient temperature.

19. A method for operating a driving device for adjusting a vehicle part, the method comprising:

driving the vehicle part via an electric drive such that an output shaft of the electric drive transmits an adjusting force to the vehicle part, providing a braking force for arresting the vehicle part in a currently adopted position via a first braking device operatively connected to the output shaft, the first braking device including at least one permanent magnet element comprising a first permanent magnet element rotatable about a longitudinal axis relative to a stationary position of the first braking device, the first permanent magnet element being operatively connected to the output shaft such that the first permanent magnet element is rotated relative to the stationary portion during a rotary movement of the output shaft; and during a movement of the vehicle part, providing, via a second braking device, a braking force for braking the movement of the vehicle part by switching the electric drive into a generator braking mode.

20. The method according to claim 19, wherein the vehicle part is a tailgate.

\* \* \* \* \*